Figure 1:
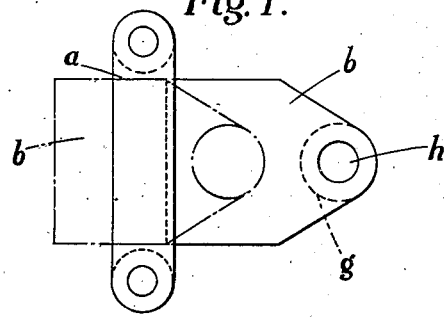

Sept. 13, 1932.  F. C. FULCHER  1,877,449
FILTERING OR FINE STRAINING APPARATUS FOR LIQUIDS
Filed Feb. 25, 1932  5 Sheets-Sheet 1

INVENTOR
Frank Christian Fulcher
BY
Nathan, Bowman & Helferich
ATTORNEYS

Sept. 13, 1932. F. C. FULCHER 1,877,449
FILTERING OR FINE STRAINING APPARATUS FOR LIQUIDS
Filed Feb. 25, 1932    5 Sheets-Sheet 2
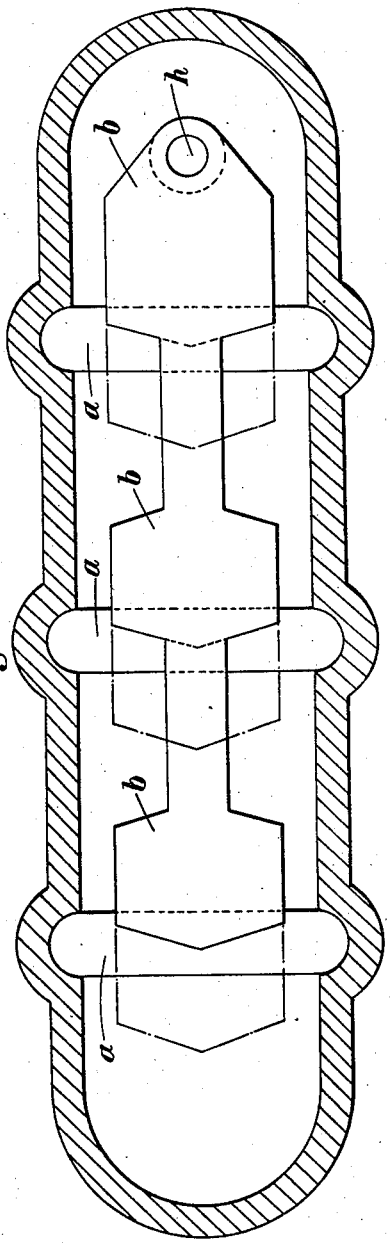
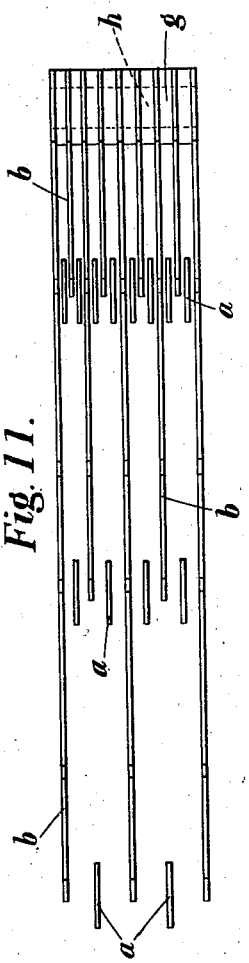

Sept. 13, 1932.   F. C. FULCHER   1,877,449
FILTERING OR FINE STRAINING APPARATUS FOR LIQUIDS
Filed Feb. 25, 1932   5 Sheets-Sheet 3

INVENTOR
Frank Christian Fulcher
BY
Nathan, Bowman & Helfrich
ATTORNEYS

Sept. 13, 1932.   F. C. FULCHER   1,877,449
FILTERING OR FINE STRAINING APPARATUS FOR LIQUIDS
Filed Feb. 25, 1932   5 Sheets-Sheet 4

INVENTOR
Frank Christian Fulcher
BY
Nathan, Bowman + Helferich
ATTORNEYS

Sept. 13, 1932.   F. C. FULCHER   1,877,449
FILTERING OR FINE STRAINING APPARATUS FOR LIQUIDS
Filed Feb. 25, 1932   5 Sheets-Sheet 5

INVENTOR
Frank Christian Fulcher
BY
Nathan, Bowman + Helferich
ATTORNEYS

Patented Sept. 13, 1932

1,877,449

UNITED STATES PATENT OFFICE

FRANK CHRISTIAN FULCHER, OF PURLEY, ENGLAND

FILTERING OR FINE STRAINING APPARATUS FOR LIQUIDS

Application filed February 25, 1932, Serial No. 595,056, and in Great Britain August 15, 1930.

The present invention relates to improvements in or relating to filtering or fine straining apparatus for fluids of the kind in which the fluid is passed through a series of fine slots of 2/100" or less width for example serving well for the fine straining of such liquids as petrol, paraffin, fuel oil, lubricating oil, oil paint, varnish, water, etc.

According to the present invention I construct the filter with two sets of members, in non-contacting relation and which are preferably in staggered formation, so that the larger impurities are trapped before they arrive at the location where filtering proper takes place whereas the finer impurities are removed in the latter position, and I arrange for a relative movement of the sets inter se, such movement being substantially directly towards or away from the slot through which the liquid enters, as I have found that this removes the impurities more effectually than movement parallel to the slot. In some cases the final filtering may take place between the opposed edges of the filtering members, instead of between their surfaces.

It will be seen therefore that the new construction is clearly distinguishable from constructions in which scrapers, which in themselves take no effective part in the filtration, are moved through the filtering slot for cleaning purposes, and from those in which one set of filtering members is rotated relatively to the other set, since in this case the relative movement is not substantially towards or away from the filtering opening. I hereinafter term such movement towards or away from the filtering opening a cross or transverse movement or movement in a transverse direction.

By non-contacting relation, as above referred to I mean a definite general clearance between the members of each series, without however excluding local contact such as is made in certain forms of the invention by well defined ribs or like scraping elements as hereinafter described. In this way a more open and rigid order of the members may be adopted with constructional and manufacturing advantages without sacrificing the fineness of the filtering or straining at which the invention aims.

The construction may be such as to give two or more degrees of trapping or interception. The transverse movement of the members effectually removes both coarse and fine impurities and this action may be supplemented by that of incoming or outgoing fluid.

The relative movement and proportioning of the co-operating series of members may be so arranged that at the limits of their interpenetrating and/or withdrawing movements the filtering elements are exposed to a washing action of the fluid. For example the agitator or moving members may be in one extreme position at the point of entering between the members of a strip grid and in the other extreme position passed therethrough and projecting therebeyond. I have so far found that the best results are obtained when the movement is such as to bring one set of members up to and beyond the inflow side or outflow side of the filter.

When the movement extends beyond the edges of the inflow side or outflow side, any material adhering to the boundary walls of the inlet side or outlet side can be dislodged. For this purpose several to and fro cross movements may be effected.

The relative movement of the members should generally be such as to dislodge the foreign matter and direct this to the inlet side of the filter or fine strainer where it may be collected in a suitable sump, but in some constructions of filters, e. g., those in which the direction of flow may be reversed, the impurities may be ejected on the outlet side.

The grids or agitators or both of these may be plain or corrugated or otherwise figured, and may be of any convenient shape. The edges may be serrated or toothlike or otherwise figured.

The movement of the members may be effected by hand or power in any suitable manner.

The drawings accompanying this specification illustrate various exemplary ways of carrying out the present invention. Certain of the figures are in diagrammatic form. It must be understood that the invention is not confined to the constructional forms here shown.

In the drawings:—

Figure 7:
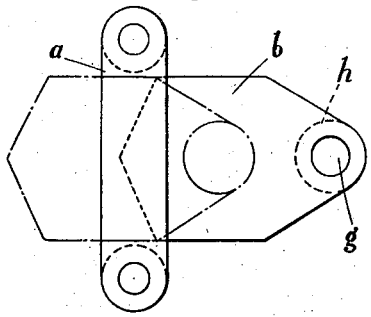
Figure 2:
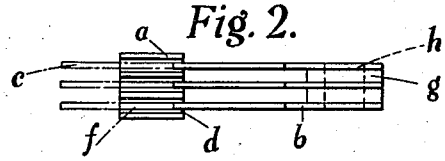
Figure 8:
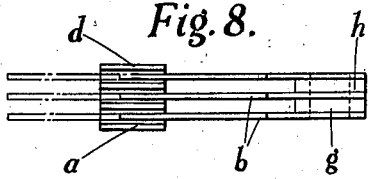
Figure 3:
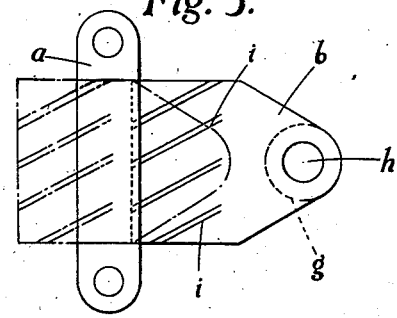
Figure 4:
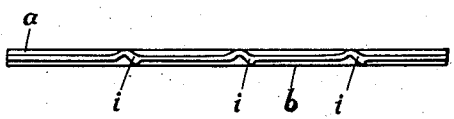
Figure 5:
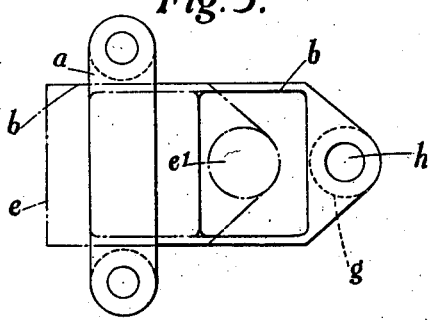
Figure 9:
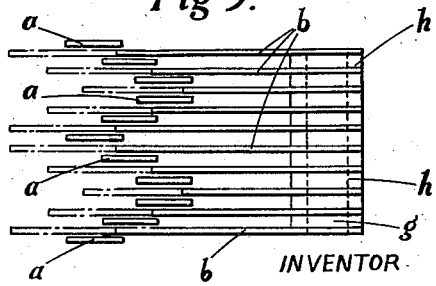
Figure 6:
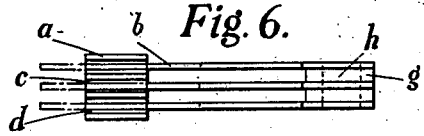
Figure 12:
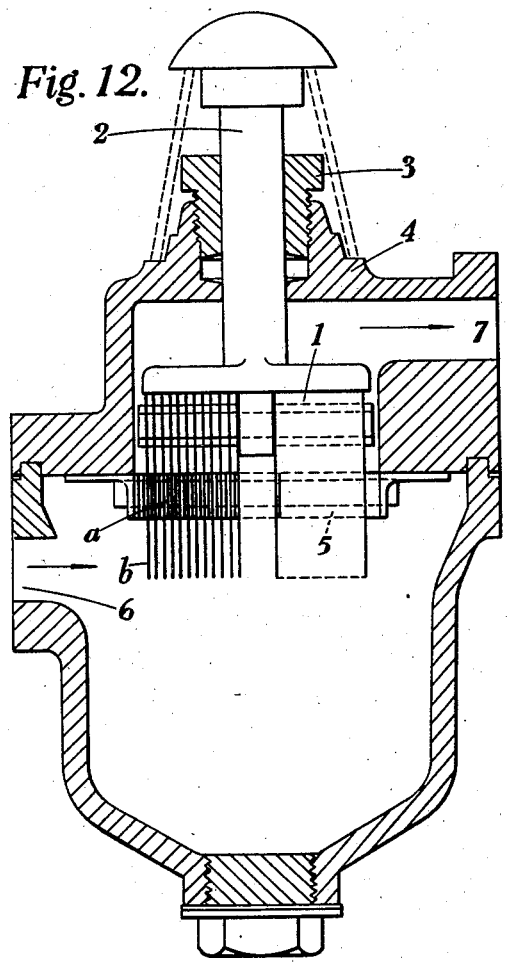
Figure 14:
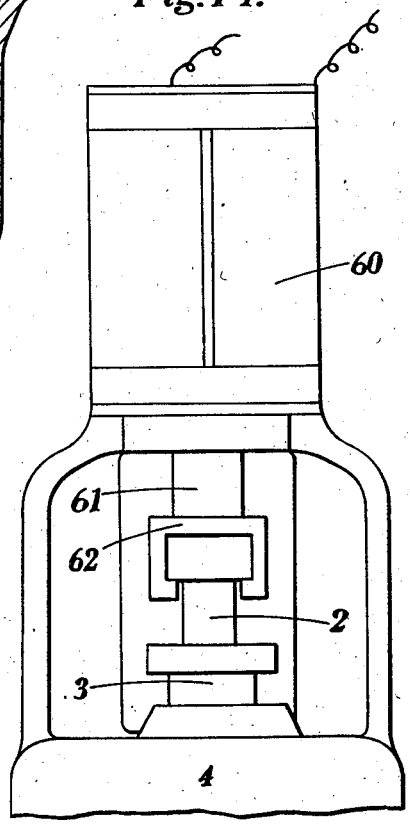
Figure 13:
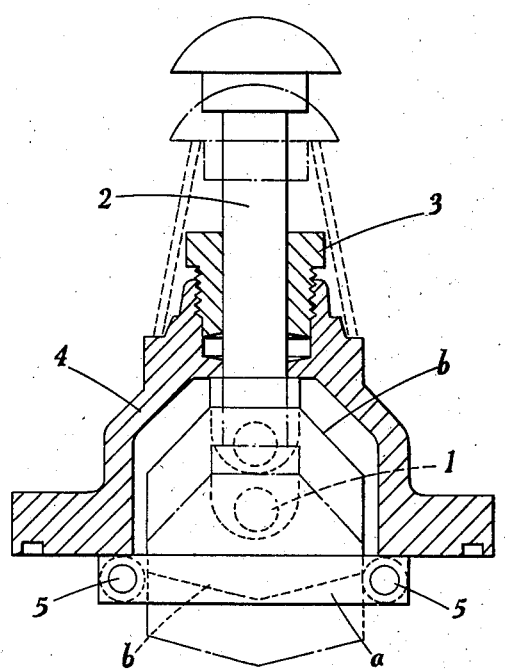
Figure 18:
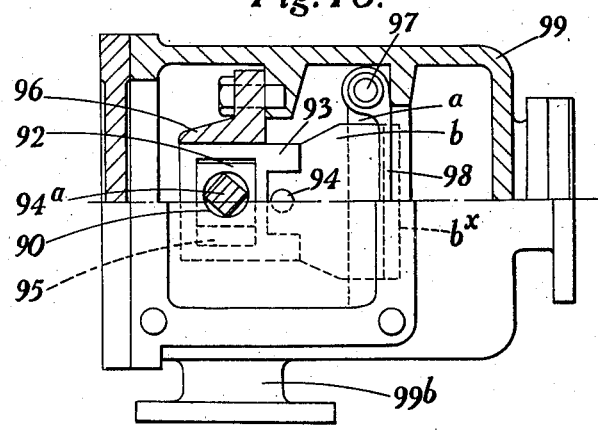
Figure 15:
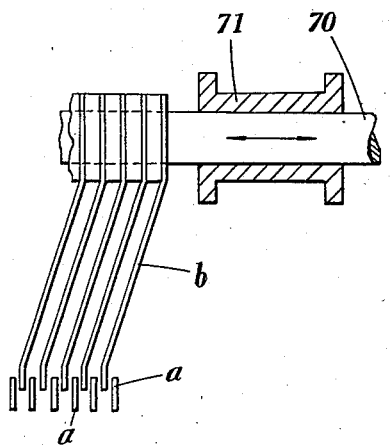
Figure 16:
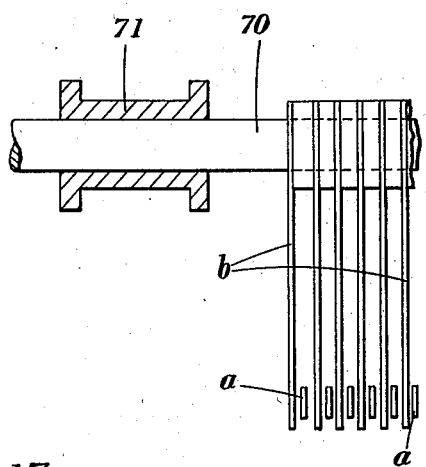
Figure 17:
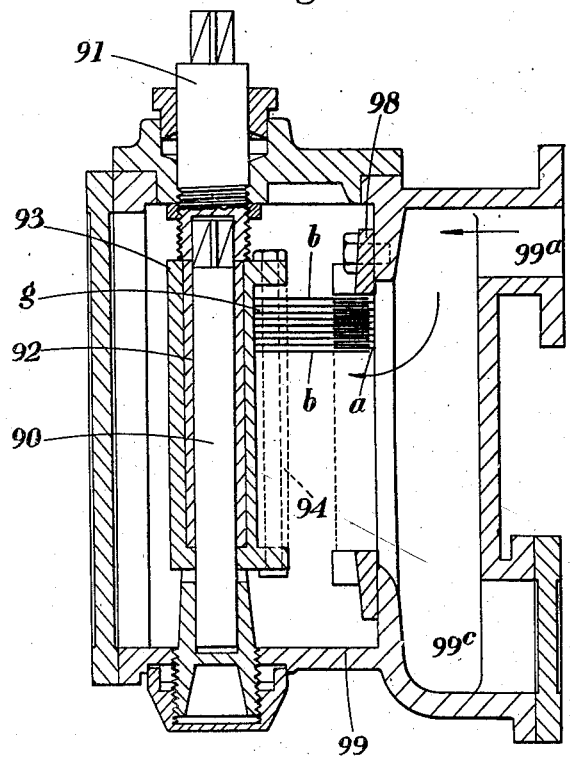

Figs. 1 and 2 are plan and side views of a form of strainer or filter comprising a fixed strip grid and movable members. Figs. 3 and 4 are views of a ribbed construction of agitating or movable members. Figs. 5 and 6 illustrate frame-like movable members so set that filtering takes place between the opposed edges of the plates. Figs. 7 and 8 illustrate agitating members with sloping leading edges. Fig. 9 shows a construction giving a plurality of trapping stations. Figs. 10 and 11 a grading straining construction. Figs. 12 and 13 a construction showing the means for effecting the relative movement by way of a rectilinear motion of the moving members. Fig. 14 illustrates an arrangement having a solenoid or electro-magnet actuation. Figs. 15 and 16 a form having spring moving members. Figs. 17 and 18 a construction in which a rectilinear movement is given to the moving members by an eccentric shaft.

Figs. 1 and 2 show plain strip members $a$ making a fixed strip grid, which grid is related to a movable row or pile of spaced agitator members $b$. The grid members $a$ are arranged in relationship to the agitator members $b$ so as to give two degrees of trapping or intercepting of the foreign matter contained in the liquid, that is to say an intercepting of the coarser matter at the entrance $c$ between the adjacent members of one series, and an intercepting of finer matter at the entrance to the fine slots $d$ formed between the adjacent grid members and the intervening agitator member.

By moving the agitator members $b$ forwards or backwards through the grid slots $f$ foreign matter adhering to the edges of the grid strips or to the agitator members and also fine matter in the slots $d$ and $f$ is dislodged.

The extent of movement of the members $b$ is from the full outline to the dotted outline in Fig. 1, so that foreign matter adhering to the boundary walls of the entrance $c$ is dislodged. This rectilinear motion may be effected in any convenient manner.

Spacing components $g$ are provided between the members $b$. These may be separate components or formed integral with the said members. The members $b$ are holed at $h$ for mounting on a part through which movement is imparted thereto.

The grid strips or agitators, or both may have spacing or scraping corrugations or the like ribs. Fig. 3 shows ribbed constructions of agitating member $b$, the ribs $i$ having an oblique setting with respect to the slots. Fig. 4 shows an enlarged view of a ribbed agitator member.

Figs. 5 and 6 show agitator members $b$ formed of a frame-like structure.

As conducing to dislodge fibrous or other foreign matter adhering to the faces of the grid strips or the agitator members, the latter may have appropriately sloped or curved leading edges. Figs. 7 and 8 show a construction in which the agitating members $b$ have sloping leading edges $j$.

In Fig. 6 the filtering space is formed by the co-operating edges of the members $a$ and $b$. In this construction one series of members $a$ is fixed and the other series $b$ movable therethrough, so that the fine filtering takes place between one or the other of the side edges of the fixed series $a$ and the side edges $e$ or $e'$ of the movable series $b$ according to the location of the frame-like structure.

A construction having more than two degrees of trapping or intercepting may be built up in various ways. For example two outside members may form an entrance for the liquid to the filter unit, and provide a station at which the coarse foreign matter is intercepted, a medial member providing with the two outside members a station at which the foreign matter of a lesser degree of coarseness is intercepted and an intervening member between each outer member and the medial member forming four fine slots and providing a station at which the foreign matter of a still lesser degree of coarseness is intercepted as the liquid passes through the filter.

Fig. 9 shows a construction giving a plurality of trapping stations made up from a series of staggered fixed members $a$ and a series of staggered movable members $b$. The extent of movement of the members $b$ is from the full outline to the dotted outline.

Figs. 10 and 11 illustrate a construction in which three filters are in series so as to give a graded straining, the first grade being at the left hand side, the second grade being the medial filter and the third grade being at the right hand side. It is to be noted that the agitator members $b$ are connected together and are moved from a common actuated member at $h$. The slots at the right hand side are fine slots.

The cleaning movement may be effected by hand or power in various ways.

The moving members may be kept in a state of constant movement, or of intermittent movement. Such movements may be imparted by any suitable means. One way of giving an intermittent movement is by an electrically actuated device comprising a solenoid control or a pawl and ratchet movement.

Figs. 12 and 13 show one method of effecting such movement. The movable members $b$ with interposed spacing components are mounted on a spindle 1 carried on the end of a spring controlled plunger 2 working through a stuffing box and gland 3 on the wall of the casing 4. The fixed members $a$ with interposed spacing components are mounted on spindles 5. The inlet is indicated at 6 and the outlet at 7. The normal position of the members *b* is shown by full outline in Fig. 13 and the dotted outline in that view and the full outline in Fig. 12, indicates the position of the members *b* when these after being moved to dislodge the foreign matter are exposed to the washing action of the ingoing fluid.

Fig. 14 shows a diagrammatic arrangement of a solenoid or electro-magnet control for imparting an intermittent reciprocating movement to the moving members. The filter or strainer is of the type shown by Figs. 12 and 13. In Fig. 14, 60 is the solenoid or electro-magnet, 61 the plunger of core thereof, 62 a loose coupling connecting the plunger to the strainer spindle 2.

An effective cleaning action in some cases may be provided by employing spring agitator members which normally assume a form in which the grid co-operating edges are drawn backward and sidewise so that on imparting movement in one direction to the rear ends of the agitator members, the front ends being held by the grid, the agitator members are straightened to cause the grid co-operating ends to move farther into the grid slots. Such a form is shown by Figs. 15 and 16, the rear end of the agitator or moving members being mounted on a shaft 70 carried in fixed bearings 71. The movable members are provided with ribs where contacting with the apertures or slots formed by the grid or fixed members *a*. Figs. 17 and 18 illustrate a construction in which the agitator members *b* are given a straight line movement by an eccentric shaft 90, which is turned by a spindle 91 actuated by hand, motor, or other suitable means.

Surrounding the shaft 90 is a sleeve member 92. This member 92 is embraced by a slider 93 having a spindle 94 on which the agitator members *b* and spacing components *g* are mounted. The slider 93 has an opening 95 to allow for movement of the sleeve member 92 in a direction at right angles to the movement of the said slider 93.

The slider 93 is guided in its rectilinear movement by guides 96, one on each side thereof.

The eccentricity between the axes of 90 and 91 indicated by the line 94*a* in Fig. 18.

The fixed strips *a* forming the grid are mounted in spaced relationship on spindles 97 carried by a frame 98 secured to flanges of the filter casing 99.

The dotted outline *b*ˣ in Fig. 18 shows the position of the agitator members *b* when these have been passed through the grid and are exposed to a washing action of the fluid.

99*a* indicates the inlet, and 99*b* the outlet, 99*c* being a sump in which the foreign matter is collected.

It is to be understood that although for the sake of clearness in the drawings the fixed and movable members are shown well spaced apart, the slots in the actual constructions are fine slots as previously defined in the opening paragraph of the specification.

Filters or fine strainers under the present invention may conveniently take the form of ranks or piles, in single or multiple and in parallel or in series as desired.

It is to be understood that any suitable form of members may be used, another example being stretched wires.

I claim:

1. Filtering or fine straining apparatus for liquids comprising in combination, a series of stationary members; a series of movable members intervening said stationary members and in non-contacting relation therewith so that a series of fine slots is formed therebetween, said movable members being adapted for straight reciprocatory movement across the stationary members in the direction of the flow of liquid through the members, the upstream edges of the movable members being shaped and arranged to dislodge entrapped foreign matter and cause same to gravitate downwardly; and means for moving said movable members.

2. A filter or fine straining appartus for liquids combining a casing member provided with an inlet and a discharge port; a screening interposed between said ports adapted to intercept foreign matter contained in the liquid as it passes therethrough, said screen comprising two series of relatively movable plate members arranged in spaced relation so that a series of fine slots is formed between adjacent faces of said members in the general plane of the flow of the liquid, said members being adapted for relative rectilinear movement perpendicular to the length of the slots therebetween; and means for effecting relative rectilinear movement between said members thereby to eject entrapped foreign matter from the slots and cause same to gravitate downwardly.

3. A screen for filtering or fine straining of liquids comprising in combination, a series of alternate moving and stationary members arranged in spaced relation so that a series of fine slots is formed therebetween, the leading edges of the respective members of each of said series being staggered with respect to each other to obtain a graduated trapping or intercepting of foreign matter contained in the liquid as it passes through the screen; and means for imparting to said series of movable members a rectilinear motion across or transverse to said series of stationary members.

4. A filtering or fine straining apparatus for liquids comprising in combination, a series of stationary members; a series of movable members intervening said stationary members and in substantially non-contacting relation therewith so that a series of fine slots is formed therebetween; local contacting parts on said members; and means for moving said movable series of members across said stationary members in a direction perpendicular to the length of the slots formed between the members.

5. Filtering or fine straining apparatus for liquids comprising in combination, a series of alternate moving and stationary members arranged in non-contacting relation so that a series of fine slots is formed therebetween, said movable members having wedge shaped leading edges and being adapted for rectilinear movement across the stationary members in a direction perpendicular to the length of the slots formed between the members; and means for moving said movable series of members.

6. A screen for filtering or fine straining of liquids comprising in combination, a plurality of serially arranged sets of alternate moving and stationary members, the members in each of said sets being positioned or spaced in non-contacting relation so that a series of slots is formed therebetween, the width of the slots in the initial set of members being greater than the width of the slots in the final set of the series to obtain a trapping of impurities at two or more stages as the liquid passes through the screen; and means common to all of the movable members of said sets of members for imparting a rectilinear movement to the movable members across said stationary members in a direction perpendicular to the length of the slots formed therebetween.

In testimony whereof, I affix my signature.

FRANK CHRISTIAN FULCHER.